US012339417B2

(12) United States Patent
Maddanimath Veerayya et al.

(10) Patent No.: US 12,339,417 B2
(45) Date of Patent: Jun. 24, 2025

(54) INADVERTENT OPERATIONS IN TOUCHLESS LAVATORY

(71) Applicant: B/E Aerospace, Inc., Winston Salem, NC (US)

(72) Inventors: Shivashankar Maddanimath Veerayya, Bangalore (IN); Ashish Shrikhande, Bangalore (IN)

(73) Assignee: B/E AEROSPACE INC., Winston Salem, NC (US)

( * ) Notice: Subject to any disclaimer, the term of this patent is extended or adjusted under 35 U.S.C. 154(b) by 385 days.

(21) Appl. No.: 17/863,274

(22) Filed: Jul. 12, 2022

(65) Prior Publication Data

US 2023/0350095 A1     Nov. 2, 2023

(30) Foreign Application Priority Data

Apr. 28, 2022   (IN) .............................. 202211025011

(51) Int. Cl.
    *G01V 8/10*    (2006.01)
    *G01J 1/16*    (2006.01)
    (Continued)

(52) U.S. Cl.
    CPC .............. *G01V 8/10* (2013.01); *G01J 1/1626* (2013.01); *G01J 1/4204* (2013.01);
    (Continued)

(58) Field of Classification Search
    CPC ........ G01V 8/10; G01J 1/1626; G01J 1/4204; G01J 1/4228; A47K 5/1217; E03C 1/057; E03D 5/105
    See application file for complete search history.

(56) References Cited

U.S. PATENT DOCUMENTS

| 4,767,922 A | 8/1988 | Stauffer |
| 5,594,238 A | 1/1997 | Endruschat et al. |
| (Continued) | | |

FOREIGN PATENT DOCUMENTS

| CN | 110537865 | 12/2019 |
| CN | 111506129 | 8/2020 |
| (Continued) | | |

OTHER PUBLICATIONS

European Patent Office, European Search Report dated Sep. 28, 2023 in Application No. 23170789.4.

*Primary Examiner* — Kamini S Shah
*Assistant Examiner* — Mohammed Shafayet
(74) *Attorney, Agent, or Firm* — SNELL & WILMER L.L.P.

(57) ABSTRACT

A method for controlling a touchless lavatory is disclosed herein. The method includes forming one or more groups of sensors from a plurality of sensors, determining that a trigger event is detected from the first sensor, and identifying a first group of sensors of the one or more groups of sensors to which the first sensor belongs. The method further includes requesting an ambient light measurement from each of the plurality of sensor. The method further includes computing an average ambient light value based on the ambient light measurement, comparing the ambient light measurement of the first sensor to the average ambient light value of all the sensors, determining that the ambient light measurement of the first sensor is less than the average ambient light value of all the sensors, and determining that the first sensor trigger event is valid.

13 Claims, 5 Drawing Sheets

(51) Int. Cl.
*G01J 1/42* (2006.01)
*A47K 5/12* (2006.01)
*E03C 1/05* (2006.01)
*E03D 5/10* (2006.01)

(52) U.S. Cl.
CPC ............ *A47K 5/1217* (2013.01); *E03C 1/057* (2013.01); *E03D 5/105* (2013.01)

(56) References Cited

U.S. PATENT DOCUMENTS

| | | | |
|---|---|---|---|
| 5,892,441 A * | 4/1999 | Woolley | G06K 17/00 340/8.1 |
| 6,250,601 B1 | 6/2001 | Kolar et al. | |
| 7,651,068 B2 | 1/2010 | Bailey | |
| 8,097,851 B2 | 1/2012 | Chang et al. | |
| 9,428,897 B2 | 8/2016 | Le et al. | |
| 9,822,514 B2 | 11/2017 | Parsons et al. | |
| 9,860,077 B2 | 1/2018 | Laurent et al. | |
| 2009/0000023 A1* | 1/2009 | Wegelin | G01S 17/88 221/13 |
| 2009/0160659 A1* | 6/2009 | Bailey | G01S 17/04 340/573.1 |
| 2011/0302708 A1* | 12/2011 | Parsons | E03D 3/02 4/313 |
| 2012/0025717 A1* | 2/2012 | Klusmann | H05B 47/11 315/152 |
| 2012/0050189 A1 | 3/2012 | Choboter et al. | |
| 2012/0330504 A1* | 12/2012 | Nelson | B60R 1/12 348/148 |
| 2015/0205521 A1* | 7/2015 | Ding | G06F 3/017 345/175 |
| 2018/0047277 A1 | 2/2018 | Thyroff | |
| 2018/0281673 A1* | 10/2018 | Garing | B60Q 3/47 |
| 2020/0068681 A1* | 2/2020 | Gagnon | H05B 47/10 |
| 2022/0031167 A1* | 2/2022 | Beldon | A61B 5/0075 |

FOREIGN PATENT DOCUMENTS

| | | |
|---|---|---|
| EP | 2011929 | 2/2013 |
| JP | 2005335822 | 12/2005 |
| JP | 2006188902 | 7/2006 |
| WO | 2016073651 | 5/2016 |
| WO | 2021102103 | 5/2021 |

* cited by examiner

INADVERTENT OPERATIONS IN TOUCHLESS LAVATORY

CROSS-REFERENCE TO RELATED APPLICATIONS

This application claims priority to, and the benefit of, India Patent Application No. 202211025011, filed Apr. 28, 2022 (DAS Code BD47) and titled "INADVERTENT OPERATIONS IN TOUCHLESS LAVATORY," which is incorporated by reference herein in its entirety for all purposes.

FIELD

The present disclosure generally relates to touchless lavatories, and more specifically to monitoring and managing sensors within touchless lavatories.

BACKGROUND

Sensors are being increasingly used in lavatories to control the operations of the sink, soap dispenser, and toilet. As lavatories include more sensors there is an increased risk of inadvertently triggering the different sensors in the lavatory. Inadvertently triggering sensors in a lavatory can be wasteful of resources, such as soap and water, and can startle the user of the lavatory causing an uncomfortable experience. As sensors are included in more compact spaces, such as airplanes, the potential for inadvertently triggering sensors in the lavatory increases.

SUMMARY

A method of controlling a touchless lavatory is disclosed herein. The method includes forming, by a processor, one or more groups of sensors from a plurality of sensors, determining, by the processor, that a trigger event is detected from the first sensor, and identifying, by the processor, a first group of sensors of the one or more groups of sensors to which the first sensor belongs. The method further includes requesting, by the processor, an ambient light measurement from each of the plurality of sensors. The method further includes computing, by the processor, an average ambient light value based on the ambient light measurement, comparing, by the processor, the ambient light measurement of the first sensor to the average ambient light value of all the sensors, determining, by the processor, that the ambient light measurement of the first sensor is less than the average ambient light value of all the sensors, and determining, by the processor, that the first sensor trigger event is valid.

In various embodiments, the method further includes determining, by the processor, that there is more than one sensor in the first group of sensors, computing, by the processor, an average ambient light value for the first group of sensors based on the, comparing, by the processor, the ambient light measurement of the first sensor to the average ambient light value of the first group, and determining, by the processor, that the ambient light measurement of the first sensor is less than the average ambient light value of the first group, before determining that the first sensor trigger event is valid.

In various embodiments, the method further includes performing, by the processor, an action in response to the determination that the first sensor trigger event is valid.

In various embodiments, the method further includes waiting, by the processor, for one sensor of a plurality of sensors to detect the trigger event before determining which sensor detected the trigger event.

In various embodiments, the determining that the trigger event is detected is in response to a motion sensor in the first sensor.

In various embodiments two or more sensors within about 2 inches to about 12 inches from each other form a group of sensors.

In various embodiments, the method further includes determining, by the processor, that a second trigger event is detected from a second sensor of the plurality of sensors, determining, by the processor, the second sensor belongs to a second group of sensors of the one or more groups of sensors, determining, by the processor, that the second trigger event is not a valid trigger event in response to the second trigger occurring less than a threshold length of time after the first trigger event.

Also disclosed herein is a lavatory sensor control system including one or more sensors where each of the one or more sensors being configured to transmit sensor data. The control system further includes one or more motors, each motor of the one or more motor connected to one of the one or more sensors. The control system further includes a central controller configured to communicate with the one or more sensors and the one or more motors, wherein the central controller receives the sensor data from the one or more sensors, processes the sensor data, and transmits a message to activate one of the one or more motors.

In various embodiments, the control system further includes one or more controllers, each controller of the one or more controllers being connected a sensor of the one or more sensors and a motor of the one or more motor, each controller being configured to communicate with the central controller.

In various embodiments, the sensor data includes an ambient light measurement and an indication of motion.

In various embodiments, the central controller is further configured to calculate an average ambient light value for the one or more sensors, compare an ambient light value from a first sensor of the one or more sensors to the average ambient light value, and transmit a message to a first motor of the one or more motors, the first motor being associated with the first sensor.

In various embodiments, the central controller is further configured to calculate an average ambient light value for a subset of the one or more sensors, compare an ambient light value from a first sensor of the one or more sensors to the average ambient light value, and transmit a message to a first motor of the one or more motors, the first motor being associated with the first sensor.

In various embodiments, the central controller is further configured to receive a first location of a first sensor of the one or more sensors, receive a second location of a second sensor of the one or more sensors, and determine to form a first group including the first sensor and the second sensor in response to the first location being below a threshold distance from the second location.

In various embodiments, the central controller is further configured to store a lookup table, the lookup table providing configuration parameters for the one or more sensors and grouping parameters for the one or more groups.

Also disclosed herein is a method including determining, by a central controller, a trigger event from a first sensor of a plurality of sensors, identifying, by the central controller, a group to which the first sensor belongs, and requesting, by the central controller, an ambient light measurement from each of the plurality of sensors, including a first ambient light measurement from the first sensor. The method further includes comparing, by the central controller, the first ambient light measurement to an average of the ambient light measurements of the plurality of sensors and activating, by the central controller, a motor in response to the trigger event being valid.

In various embodiments, the method further includes computing, by the central controller, the average of the ambient light measurements of the plurality of sensors.

In various embodiments, the method further includes determining, by the central controller, a second trigger event from a second sensor of the plurality of sensors, identifying, by the central controller, a second group to which the second sensor belongs, the second group being different than the group, and determining, by the central controller, that the second trigger event is a simultaneous event.

In various embodiments, method further includes determining, by the central controller, that the first ambient light measurement is less than the average ambient light measurement of the plurality of sensors.

In various embodiments, the determining further includes the difference between the first light measurement and the average ambient light measurement being greater than a threshold value.

In various embodiments, the requesting the ambient light measurement from each sensor of the plurality of sensors include polling each sensor of the plurality of sensors.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
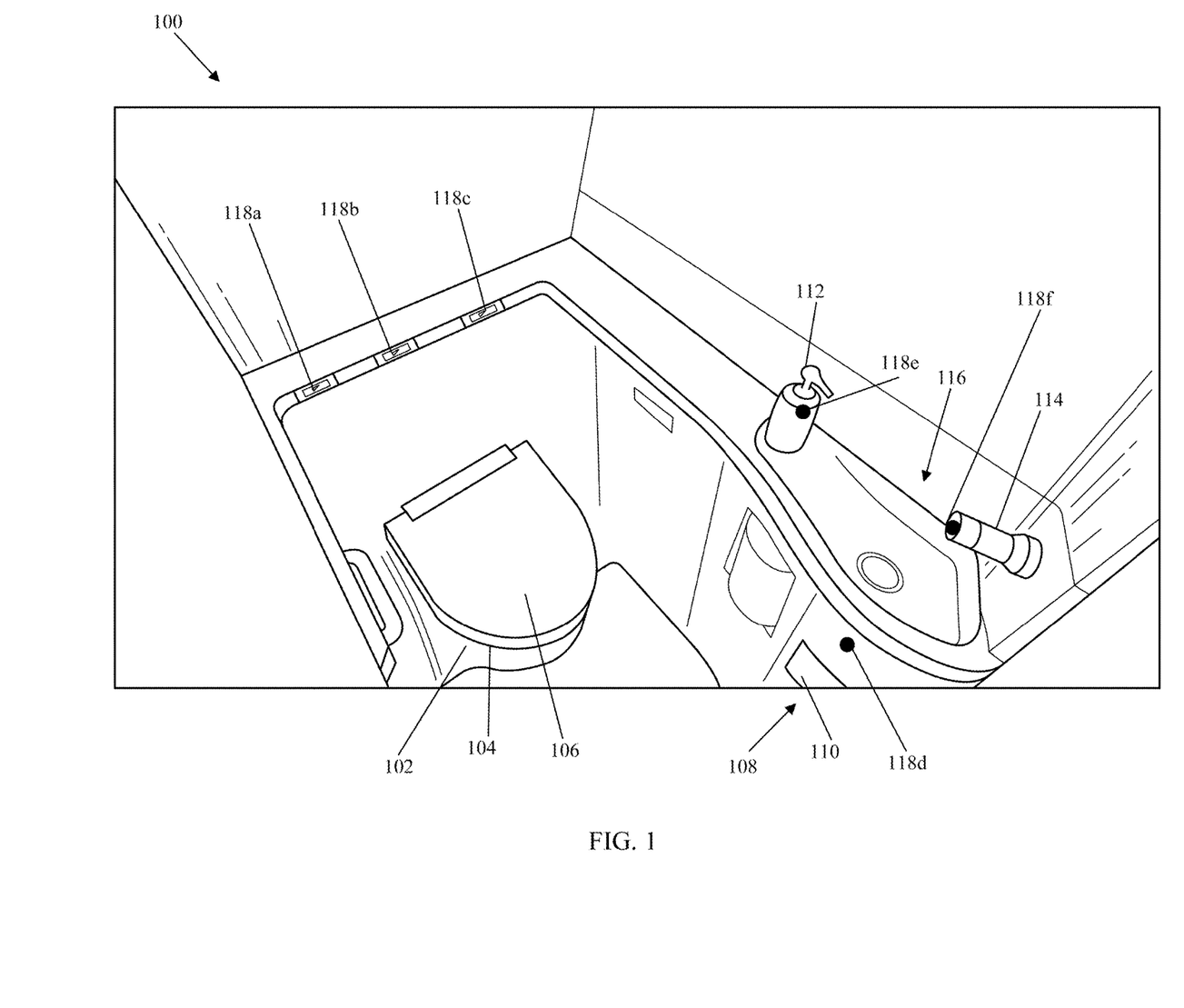
FIGS. 1-2 illustrate perspective views of a touchless lavatory and sensors, according to various embodiments of the present disclosure.

Referring to FIG. 1, in accordance with various embodiments, an exemplary touchless lavatory 100 is illustrated. Touchless lavatory 100 may be implemented in a variety of locations including an aircraft, a train, and an office building. Touchless lavatory 100 includes components such as a toilet 102 having a cover 104 and a seat 106, a trash can 108 with a flap 110, a soap dispenser 112, a faucet 114, and a sink 116. The cover 104 moves up and down in order to use the toilet 102 in a seated position. The cover 104 and seat 106 moves up and down in order to use the toilet 102 in a standing position. The flap 110 moves in and out to allow for disposal of garbage into trash can 108. Motors, or actuators, are located within the touchless lavatory to operate each of the toilet 102, cover 104, seat 106, flap 110, soap dispenser 112, and faucet 114. The motors may be located near or within the component which the motor controls.

Touchless lavatory 100 further includes a number of sensors 118a-118f Each of the sensors 118a-118f is associated with a component and the associated motor within touchless lavatory 100. For example, sensor 118a may be associated the toilet 102, and more specifically with flushing the toilet 102; sensor 118b may be associated with the cover 104; sensor 118c may be associated with the seat 106; sensor 118d may be associated with the flap 110; sensor 118e may be associated with the soap dispenser 112; and sensor 118f may be associated with the faucet 114. Each sensor 118a-118f may include an ambient light sensor and a proximity sensor. The ambient light sensor detects the amount of light reaching the sensor 118a-118f The proximity sensor detects how close an object is to the sensor 118a-118f and/or movement near the sensor 118a-118f. For example, sensor 118a sends a value(s) to a processor in response to detecting movement, such as via its proximity sensor, and the processor commands the motor associated with toilet 102 to activate, thereby flushing the toilet 102. Similarly, sensor 118b sends a value(s) to a processor in response to detecting movement, such as via its proximity sensor, and the processer commands the motor associated with cover 104 to raise or lower cover 104. Likewise, sensor 118c sends a value(s) to a processor in response to detecting movement, such as via its proximity sensor, and the processor commands the motor associated with seat 106 to activate to raise or lower seat 106. Similarly, sensor 118d sends a value(s) to a processor in response to detecting movement, such as via its proximity sensor, and the processor commands the motor associated with flap 110 to open or close flap 110. Likewise, sensor 118e sends a value(s) to a processor in response to detecting movement, such as via its proximity sensor, and the processor commands the motor associated with the soap dispenser 112 to activate and dispense soap. Similarly, sensor 118f sends a value(s) to a processor in response to detecting movement, such as via its proximity sensor, and the processor commands the motor associated with faucet 114 to turn on faucet 114 allowing water to flow into sink 116.

Figure 2:
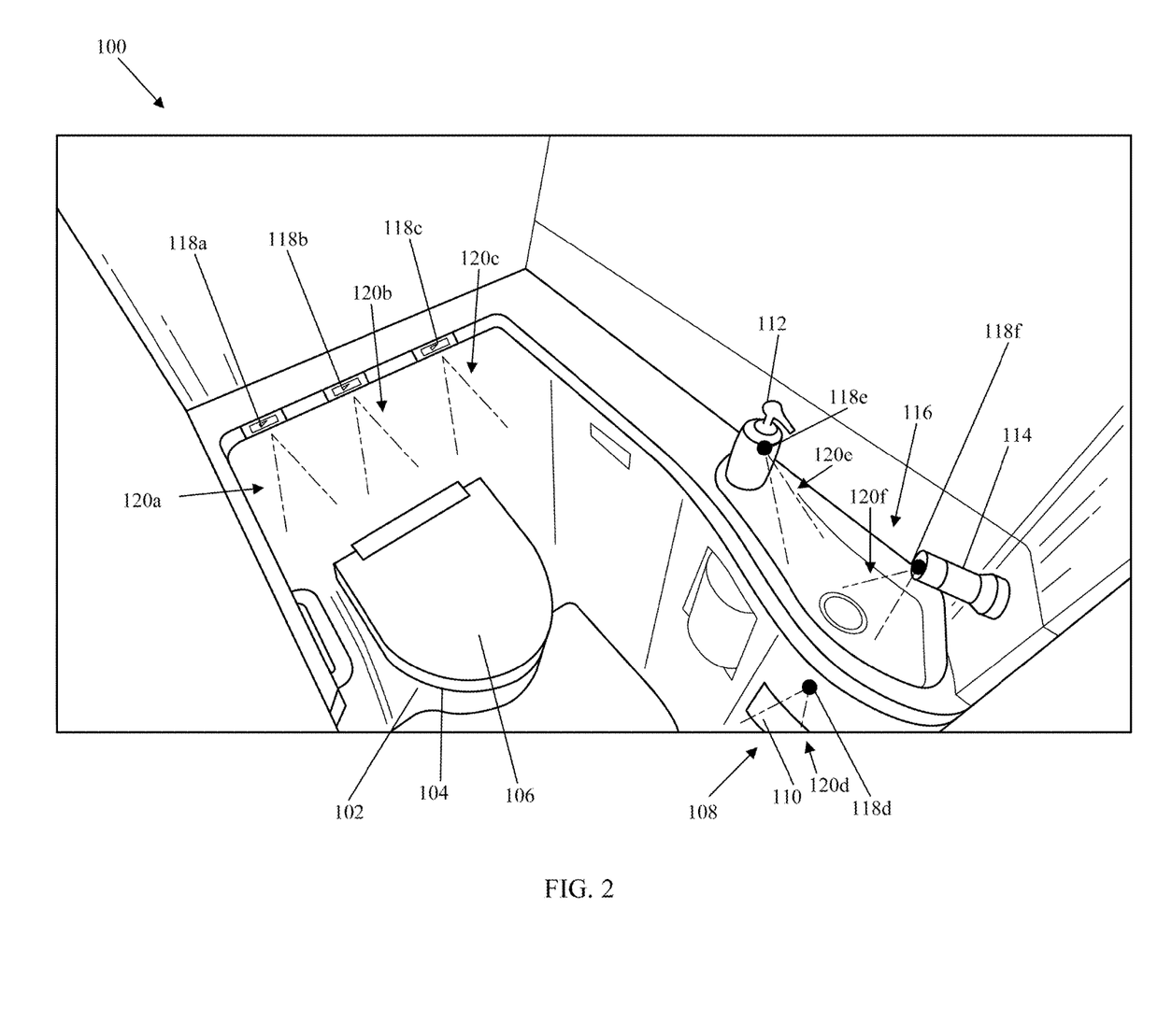

Referring now to FIG. 2, a sensing area 120a-120f of the sensors 118a-118f is depicted with respect to the touchless lavatory 100. The sensing area 120a-120f, also referred to as a cone, indicates the area of proximity detection for each of the sensors 118a-118f. Such that sensing area 120a depicts the area of proximity detection of sensor 118a; sensing area 120b depicts the area of proximity detection of sensor 118b; sensing area 120c depicts the area of proximity detection of sensor 118c; sensing area 120d depicts the area of proximity detection of sensor 118d; sensing area 120e depicts the area of proximity detection of sensor 118e; and sensing area 120f depicts the area of proximity detection of sensor 118f. According to various embodiments, the sensors 118a-118f may be configured to increase or decrease the sensitivity of sensors 118a-118f thereby increasing or decreasing the sensing areas 120a-120f in a horizontal and/or a vertical plane. In various embodiments the sensitivity of the sensors may be set between about 1 cm (about 0.4 inches) to about 25 cm (about 9.9 inches), between about 3 cm (about 1.2 inches) and about 15 cm (about 5.9 inches), and between about 5 cm (about 1.9 inches) and about 10 cm (about 3.9 inches). The sensitivity may depend on proximity to other sensors and/or components within the touchless lavatory 100.

The depicted configurations of the components (e.g., toilet 102, cover 104, seat 106, flap 110, soap dispenser 112, and faucet 114) and sensors 118a-118f for illustrative and discussion purposes only and are not meant to be limiting. While the disclosure refers to the touchless lavatory 100 as depicted in the depicted arrangement of FIGS. 1 and 2, the disclosure nevertheless contemplates different arrangements and configurations of the components and sensors of the touchless lavatory 100.

Given the proximity of components of the touchless lavatory 100, the locations of sensors 118a-118f, and the sensing area 120a-120f of each sensor 118a-118f, it can be appreciated that there is potential for inadvertent activations of the sensors 118a-118f and components within the touchless lavatory 100, though in various embodiments this risk is mitigated.

Figure 3:
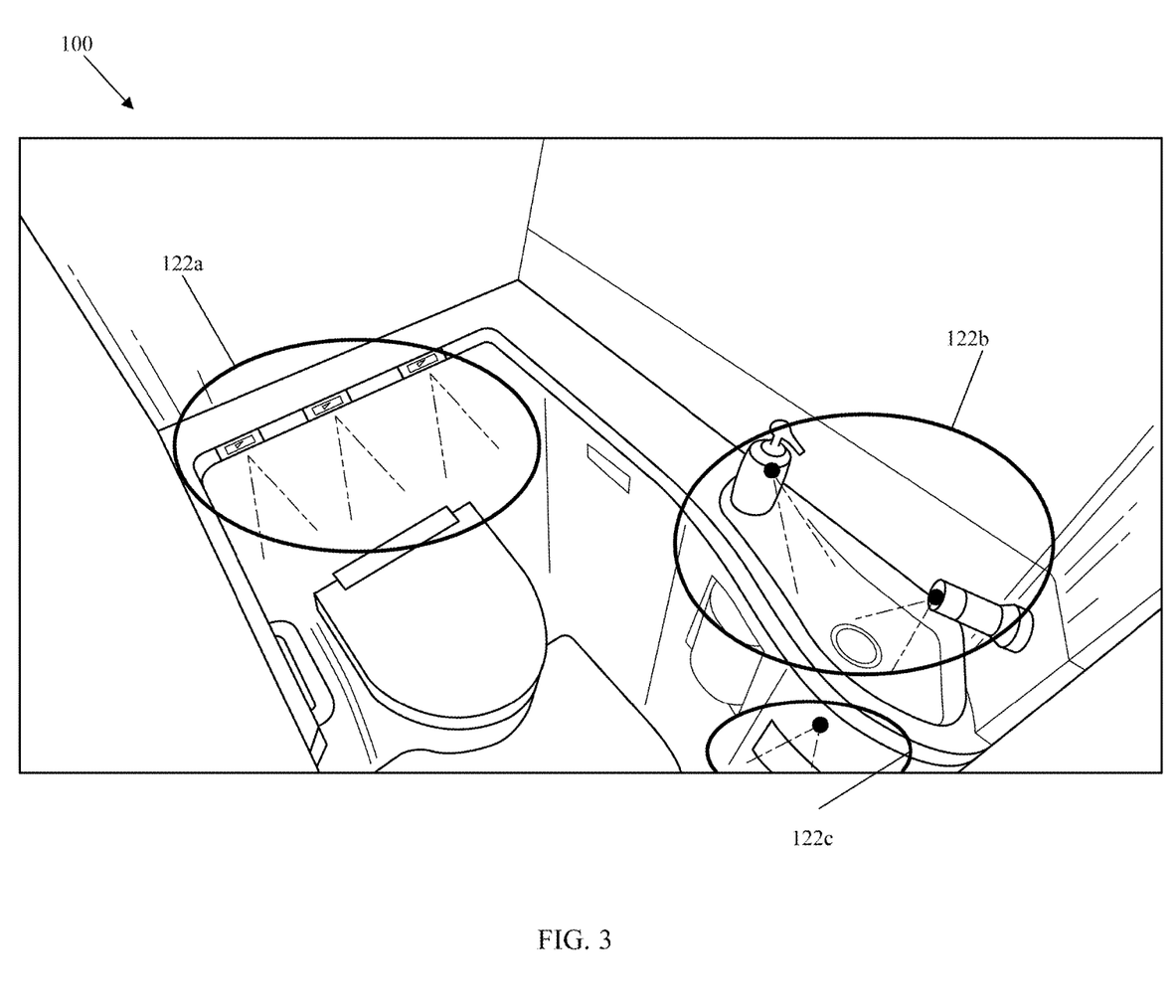
FIG. 3 illustrates a perspective view of a touchless lavatory, sensors, and sensor groupings, according to various embodiments of the present disclosure.

Referring now to FIG. 3, sensor groups 122a-122c are depicted with respect to touchless lavatory 100. According to various embodiments of the present disclosure, sensors 118a-118f may be grouped according to location, component type, and/or other factors. In the depicted embodiment, sensor group 122a includes sensors 118a-118c, sensor group 122b includes sensors 118e, 118f, and sensor group 122c includes sensor 118d. Groups 122a-122c are illustrative only and are not meant to be limiting. However, for ease of discussion, groups 122a-122c will be referred to below as the groupings for touchless lavatory 100.

Grouping sensors 118a-118f into groups 122a-122c as depicted may reduce, or eliminate, inadvertent activations of sensors 118a-118f In an exemplary implementation, a microcontroller may be used to monitor each of the sensors 118a-118f and control each of the motors associated with the sensors 118a-118f and the components of the touchless lavatory 100. One of sensors 118a-118f sends a value(s) to the microcontroller in response to being triggered by an object or a user of the touchless lavatory 100 entering the sensing area 120a-120f of the sensor 118a-118f. The microcontroller sends a request to all sensors 118a-118f to measure the ambient light (ALS) of each sensor 118a-118f in response to receiving the value(s) from the triggered sensor 118a-118f. The ALS measurements may be in any unit such as lumen, candles, lux, etc. For simplicity the unit lumens will be used. The microcontroller computes the average ambient light of all of the sensors 118a-118f which will be referred to as ALSall. The microcontroller further computes the average ambient light of all of the sensors 118a-118f within the group to which the triggered sensor belongs, which will be referred to as ALSgroup. For example, if sensor 118a is triggered, then the average ambient light of group 120a will be computed, averaging the ambient light detected by sensors 118a-118c. In another example, sensor 118d is triggered resulting in the average ambient light of group 120c being calculated. Since sensor 118d is the only sensor in group 120c in this example, the ALSgroup value is the same as the ambient light value for sensor 118d.

The ALS of the triggered sensor is compared to ALSall and ALSgroup. The trigger is considered valid if ALS is less then ALSall by at least a first threshold and less than ALSgroup by at least a second threshold. The first and second thresholds may be determined based on a variety of factors including light intensity, proximity between sensors, layout of the touchless lavatory 100, etc. In various embodiments, the first threshold is larger than the second threshold since the triggering object, such as a user, would be closer to the triggered sensor, and sensor group, than to the other sensors and groups. For example, if a user intends to trigger sensor 118a, the user would be closer to group 120a than to groups 120b, 120c. Therefore, ALSall would be higher than ALSgroup which would be higher than ALS of sensor 118a for it to be a valid trigger. Alternatively, an inadvertent trigger would result in the ALS of the triggered sensor being above the first threshold and/or the second threshold. This may be caused by the user being out of position for intending to trigger the triggered sensor.

In various embodiments, the first threshold and the second threshold are stored in a lookup table that accounts for at least the layout of the touchless lavatory 100, the groups 120a-120c of the sensors 118a-118f, and the lighting within the touchless lavatory 100. The first threshold and second threshold may be determined using manual calibration and the data may be used to populate the lookup table.

In various embodiments, the first threshold and the second threshold may be computed, such as by the microcontroller, based on input provided during installation. The input may include at least the distance between the sensors and an intensity value of the light.

As an example, a user sitting on the seat 106 and leaning back will cover the sensors 118a, 118b, 118c associated with the toilet 102 flush and moving the cover 104 and seat 106. One or more of the sensors 118a, 118b, 118c will be triggered by this action. Once triggered, the ambient light data is requested from all sensors 118a-118f, the average data is calculated for all of the sensors 118a-118f and for group 120a, to which sensors 118a, 118b, 118c belong. Because, in this example. the user is sitting on the toilet and activating all sensors in the group 120a, the average ambient light value for group 120a will be lower than if only one sensor was activated. Each of sensors 118a, 118b, 118c will have an ambient light value that is close to the average ambient light value of the group 120a and the difference in values will not exceed the second threshold. The triggered will be ignored as an inadvertent trigger.

In contrast, a user standing in front of the toilet 102 may waive their hand in front of a sensor, such as sensor 118c. Again, ambient light values will be requested from all sensors 118a-118f and averages will be computed. However, this time the ambient light value of sensor 118c will be greater than the average of group 120a because sensors 118a, 118b are not being blocked and/or triggered which will increase the average ambient light value of group 120a. This will be considered a valid trigger and the seat 106 will be commanded to move.

Figure 4:
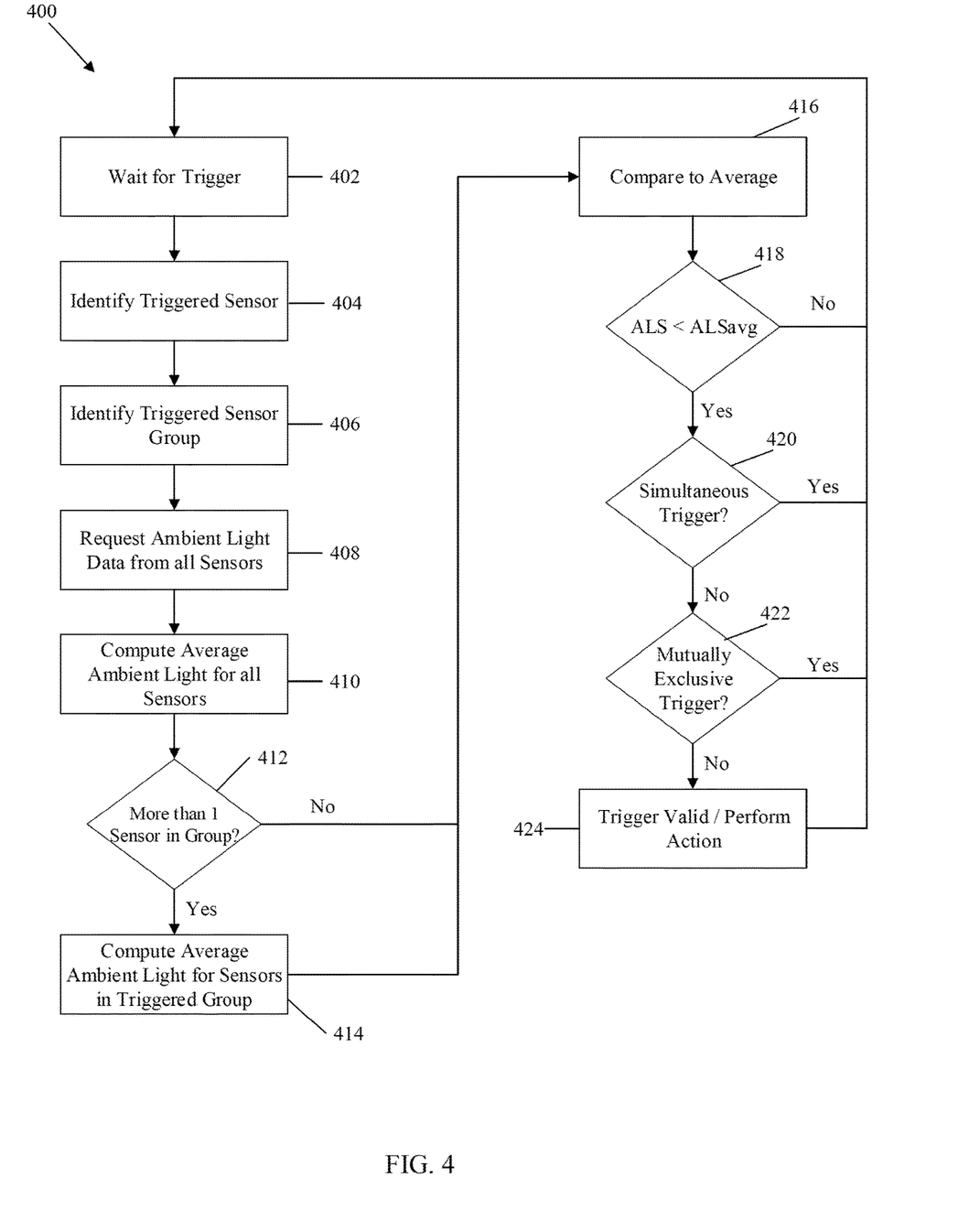
FIG. 4 illustrates a flow diagram for monitoring sensors and triggering actuators in a touchless lavatory, according to various embodiments of the present disclosure.

Referring to FIG. 4, depicted an exemplary method 400 for identifying valid sensor triggers according to various embodiments of the present disclosure. The method 400 may be implemented by a microcontroller, a processor, an ASIC, or other processing means.

At block 402, the microcontroller waits for a trigger to be detected by one of the sensors 118a-118f.

At block 404, the microcontroller identifies the triggered sensor. In various embodiments, the microcontroller receives a message from the triggered sensor that identifies which sensor was triggered. In various embodiments, the microcontroller receives a notification that a sensor is triggered. The microcontroller then polls the sensors 118a-118f to identify which sensor is triggered. The ambient light value may be referred to as ALS.

At block 406, the microcontroller identifies the triggered sensor's group. In various embodiments, the microcontroller maintains a table, array, listing, or other suitable data structure for correlating a sensor to a group.

At block 408, the microcontroller requests ambient light data from all the sensors 118a-118f. In various embodiments, the microcontroller sends an asynchronous request to each of the sensors and receives a response identifying the sensor and the ambient light value. In various embodiments, the microcontroller polls each sensor individually to obtain the ambient light value for each sensor.

At block 410, the microcontroller computes the average ambient light value for all the sensors. The average ambient light value may be referred to as ALSall. In various embodiments, the mean ambient light value of the sensors is calculated. In various embodiments, the median ambient light value of the sensors is calculated.

At decision block 412, the microcontroller determines whether there is more than one sensor in the identified sensor group. If it is determined that there is more than one sensor in the sensor group, the method 400 proceeds to block 414.

At block 414, the microcontroller computes the average ambient light value for all the sensors in the group to which the triggered sensor belongs. The average ambient light value may be referred to as ALSgroup.

Returning to decision block 412, if instead it is determined that there is one sensor in the sensor group, the method 400 proceeds to block 416.

At block 416, the microcontroller compares the ALS value of the triggered sensor to ALSall and ALSgroup. The microcontroller identifies the difference between ALS and ALSall referred to as DIFFall and the difference between ALS and ALSgroup referred to as DIFFgroup. The calculations may be made in lumens, candles, lux, or another suitable unit. However, the ratio of the values may also be used.

At decision block 418, the microcontroller determines whether the ALS value is less than the averages. That is, whether ALS is less than ALSall by a first threshold and ALS is less than ALSgroup by a second threshold. In other words, the microcontroller determines whether DIFFall is greater than the first threshold and whether DIFFgroup is greater than the second threshold. If it is determined that the ALS is not less than either ALSall by the first threshold or ALSgroup by the second threshold, then the method 400 proceeds to block 402 to wait for a trigger to be detected.

If instead, at decision block 418, it is determined that the ALS is less than ALSall and ALSgroup by the first threshold and second threshold respectively, then the method 400 proceeds to decision block 420.

At decision block 420, the microcontroller determines whether there is a simultaneous trigger. In various embodiments, there are defined unserviceable or invalid requests based on the physical proximity of one sensor or group to another sensor or group and a time difference between triggers. Simultaneous triggers may be considered triggers that are inadvertent because they happened too quickly to be considered intended triggers. For example, in the depicted embodiment, an invalid request may include triggering group 120a within a time period of triggering group 120b. The time period may be about 2 seconds. In various embodiments, the time period may be about 1 second to about 3 seconds. In various embodiments, the time period may be about 0.05 seconds to about 5 seconds. If it is determined that the trigger is a simultaneous trigger and the request is invalid, the method 400 proceeds to block 402 to wait for a trigger to be detected.

If instead, at decision block 420, it is determined that the trigger is not a simultaneous trigger, the method 400 proceeds to decision block 422.

At decision block 422, the microcontroller determines whether there is a mutually exclusive trigger. In various embodiments, a mutually exclusive trigger defines an unserviceable or invalid request based on the physical proximity of one sensor or group to another sensor or group and a time difference between triggers. Mutually exclusive triggers may be considered triggers that are inadvertent because of the higher likelihood that a user is intending to trigger a nearby sensor or group. For example, in the depicted embodiment groups 120b and 120c may be considered mutually exclusive. Because of their proximity, there is a high likelihood that a user may inadvertently trigger either group 120b or 12c while attempting to use the other group. Therefore, triggers within a time period may be determined to be invalid. In various embodiments, the time period may be about 0.05 seconds to about 5 seconds. In various embodiments, the time period may be about 1 second to about 3 seconds. In various embodiments, the time period may be about 2 seconds. If it is determined that the trigger is a mutually exclusive trigger, then the method 400 proceeds to block 402 to wait for a trigger to be detected.

If instead, at decision block 422, it is determined that the trigger is not a mutually exclusive trigger, then the method 400 proceeds to block 424.

At block 424, the microcontroller performs an action based on the valid trigger. In some examples, the action may be flush the toilet 102, or lift the cover 104, or activate the faucet 114 to name a few.

Figure 5:
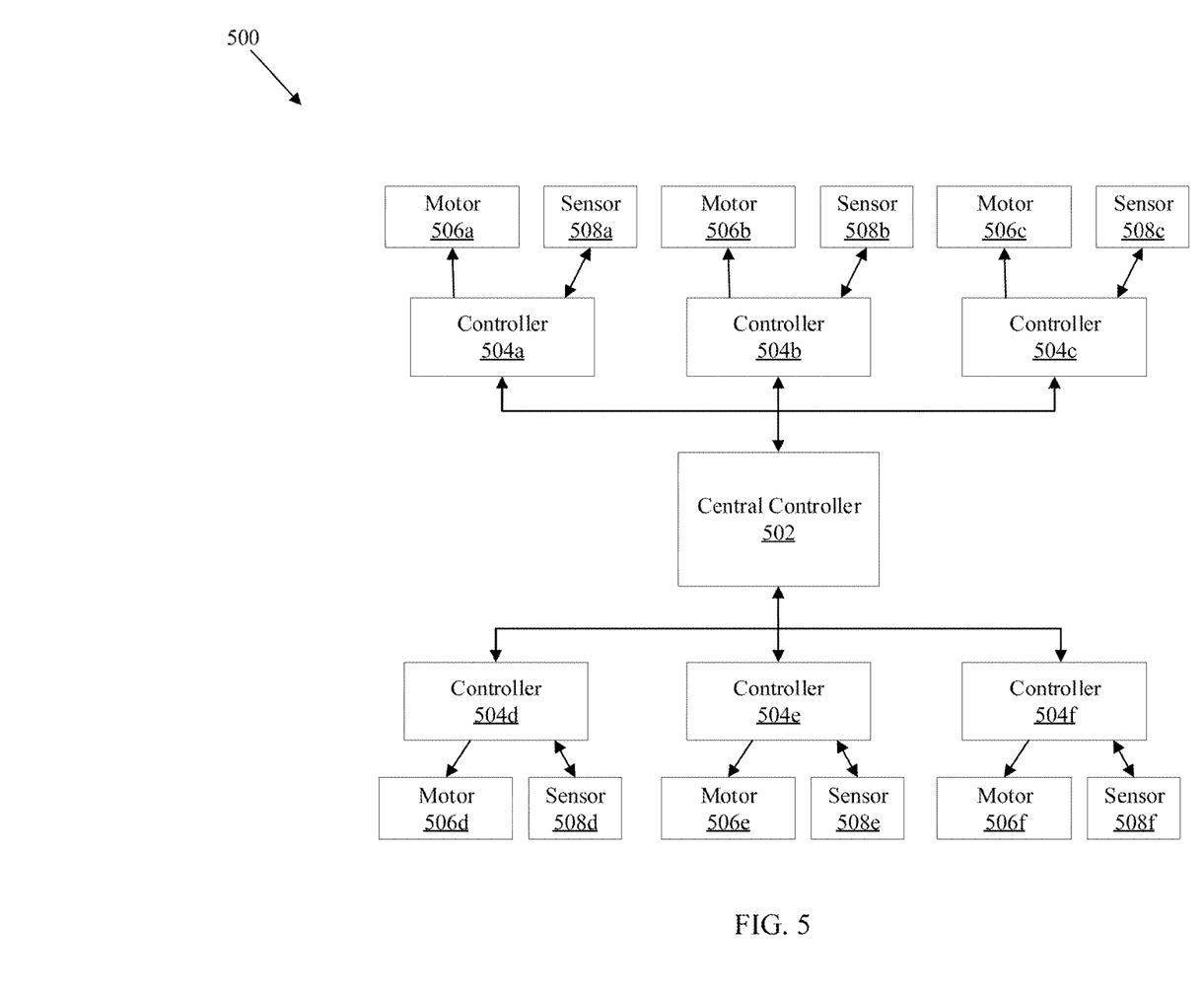
FIG. 5 illustrates an exemplary system architecture for monitoring sensors and triggering actuators in a touchless lavatory, according to various embodiments of the present disclosure.

Referring now to FIG. 5, illustrated is a system architecture 500 for monitoring sensors 118a-118f and activating motors according to various embodiments of the present disclosure. System architecture 500 includes a central controller 502, one or more controllers 504a-504f, one or more motors 506a-506f, and one or more sensors 508a-508f. Central controller 502 and controllers 504a-504f may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof.

Central controller 502 and controllers 504a-504f may include memory to store executable instructions and data to implement control logic of central controller 502 and controllers 504a-504f. The memory of central controller 502 and controllers 504a-504f may comprise a tangible, non-transitory storage medium and may store data used, for example, for lookup tables and sensor distance information.

Motors 506a-506f are connected to their respective controllers 504a-504f. Motors 506a-506f are activated and deactivated by their respective controllers 504a-504f. Motors 506a-506f are connected to components, such as those in the touchless lavatory, to move them in response to being activated by their respective controllers 504a-504f.

Sensors 508a-508f may comprise one or more sensors including at least an ambient light sensor and a proximity sensor. Sensors 508a-508f are connected to their respective controllers 504a-504f to communicate sensor data to the central controller 502.

In various embodiments, central controller 502 receives data from controllers 504a-504f and sends instructions to controllers 504a-504f. Data may include proximity data, ambient light data, location information, etc. Instructions may include commands to activate or deactivate one of the motors 506a-506f. In various embodiments, central controller 502 and controllers 504a-504f are programmed and configured to implement method 400 disclosed herein.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method, comprising:
   forming, by a processor, one or more groups of sensors from a plurality of sensors;
   determining, by the processor, that a first trigger event is detected from a first sensor of the plurality of sensors;
   identifying, by the processor, a first group of sensors of the one or more groups of sensors to which the first sensor belongs;
   requesting and then receiving, by the processor, an ambient light measurement from each of the plurality of sensors;
   computing, by the processor, an average ambient light value of all sensors based on the ambient light measurement from each of the plurality of sensors;

comparing, by the processor, the ambient light measurement of the first sensor to the average ambient light value of all sensors;
determining, by the processor, that the ambient light measurement of the first sensor is less than the average ambient light value of all sensors;
determining, by the processor, that the first trigger event is valid based on the determining that the ambient light measurement of the first sensor being less than the average ambient light value of all sensors; and
performing, by the processor, an action in response to the determining that the first trigger event is valid.

2. The method of claim 1, further comprising:
waiting, by the processor, for one sensor of the plurality of sensors to detect the first trigger event before determining which sensor detected the first trigger event.

3. The method of claim 1, wherein the determining that the first trigger event is detected is in response to the first sensor, wherein the first sensor is a motion sensor.

4. The method of claim 1, wherein two or more sensors of the plurality of sensors are within 2 inches to 12 inches from each other form a group of sensors in the one or more groups of sensors.

5. The method of claim 1, further comprising:
determining, by the processor, that a second trigger event is detected from a second sensor of the plurality of sensors;
determining, by the processor, the second sensor belongs to a second group of sensors of the one or more groups of sensors; and
determining, by the processor, that the second trigger event is not a valid trigger event in response to the second trigger event occurring less than a threshold length of time after the first trigger event.

6. A lavatory sensor control system, comprising:
one or more sensors, each of the one or more sensors being configured to transmit sensor data;
one or more motors, each motor of the one or more motors connected to one of the one or more sensors; and
a central controller configured to communicate with the one or more sensors and the one or more motors, wherein the central controller receives the sensor data from the one or more sensors, processes the sensor data, and transmits a message to activate one of the one or more motors, wherein the sensor data includes an ambient light measurement and wherein the central controller is further configured to:
identify a first group of sensors of one or more groups of sensors of the one or more sensors to which a first sensor belongs;
request and then receive the ambient light measurement from each of the one or more sensors;
compute an average ambient light value of all sensors in the one or more sensors based on the ambient light measurement from each sensor of the one or more sensors;
compare the ambient light measurement of the first sensor to the average ambient light value of all sensors in the one or more sensors;
determine that the ambient light measurement of the first sensor is less than the average ambient light value of all sensors;
determine that a first trigger event from the first sensor of the one or more groups of sensors to which the first sensor belongs is valid based on determining that the ambient light measurement of the first sensor being less than the average ambient light value of all sensors; and
perform an action in response to the determining that the first trigger event is valid, wherein the action is transmitting the message to a first motor of the one or more motors, the first motor being associated with the first sensor.

7. The lavatory sensor control system of claim 6, further comprising:
one or more controllers, each controller of the one or more controllers being connected a sensor of the one or more sensors and a motor of the one or more motors, each controller being configured to communicate with the central controller.

8. The lavatory sensor control system of claim 6, wherein the central controller is further configured to:
receive a first location of the first sensor of the one or more sensors;
receive a second location of a second sensor of the one or more sensors; and
determine to form a first group including the first sensor and the second sensor in response to the first location being below a threshold distance from the second location.

9. The lavatory sensor control system of claim 6, wherein the central controller is further configured to store a lookup table, the lookup table providing configuration parameters for the one or more sensors and grouping parameters for the one or more groups of sensors.

10. A method, comprising:
determining, by a central controller, a first trigger event from a first sensor of a plurality of sensors;
identifying, by the central controller, a group to which the first sensor belongs;
requesting and then receiving, by the central controller, an ambient light measurement from each of the plurality of sensors, including a first ambient light measurement from the first sensor;
computing, by the central controller, an average ambient light value of all sensors based on the ambient light measurement from each of the plurality of sensors;
comparing, by the central controller, the first ambient light measurement to the average ambient light value of all sensors;
determining, by the central controller, that the ambient light measurement of the first sensor is less than the average ambient light value of all sensors;
determining, by the central controller, that the first trigger event is valid based on determining that the ambient light measurement of the first sensor being less than the average ambient light value of all sensors; and
activating, by the central controller, a motor in response to the first trigger event being valid.

11. The method of claim 10, further comprising:
determining, by the central controller, a second trigger event from a second sensor of the plurality of sensors;
identifying, by the central controller, a second group to which the second sensor belongs, the second group being different than the group; and
determining, by the central controller, that the second trigger event is a simultaneous event.

12. The method of claim 6, wherein the determining further includes a difference between the first ambient light measurement and the average ambient light value of all sensors than a threshold value.

13. The method of claim 10, wherein the requesting the ambient light measurement from each sensor of the plurality of sensors include polling each sensor of the plurality of sensors.

* * * * *